UNITED STATES PATENT OFFICE.

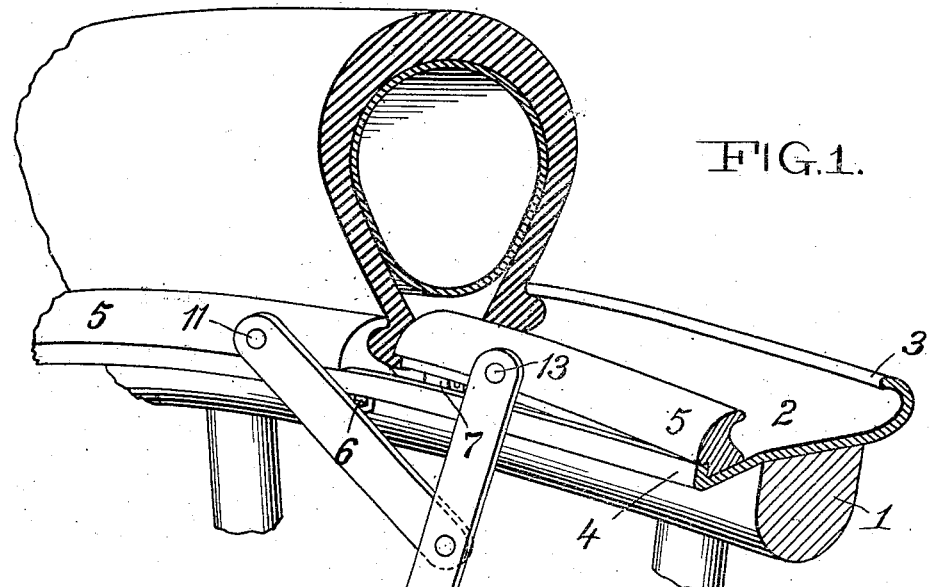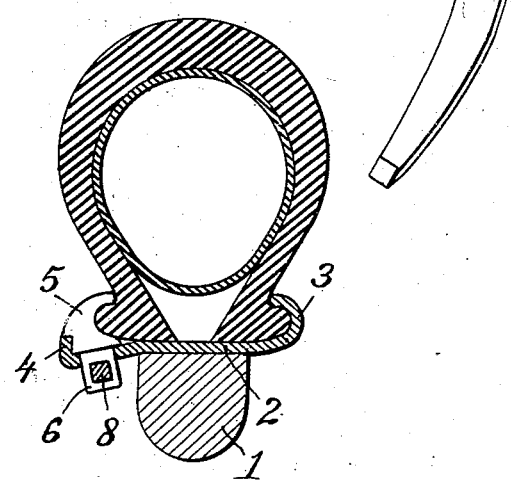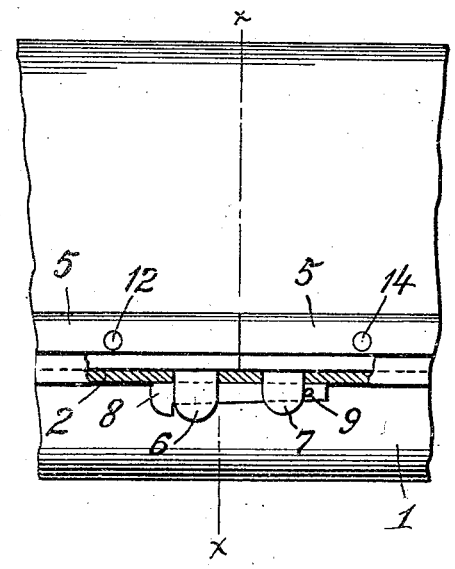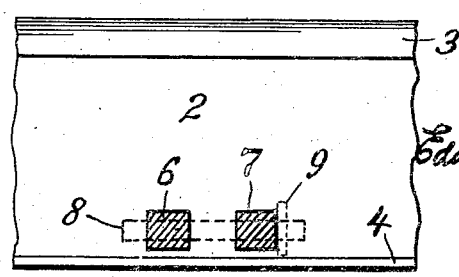

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 894,292.  Specification of Letters Patent.  Patented July 28, 1908.

Application filed February 20, 1907. Serial No. 358,462.

*To all whom it may concern:*

Be it known that I, EDWIN COUPLAND SHAW, a citizen of the United States, residing in the city of Akron, county of Summit, and state of Ohio, have invented certain new and useful Improvements in Vehicle-Wheel Rims, of which the following is a specification, reference being had to the accompanying drawings, which form a part thereof.

My invention relates to that class of vehicle wheel rims designed for use with tires of resilient materials, and more particularly to rims adapted for use with detachable tires.

I have described and claimed in a companion application an improved vehicle wheel rim having one tire flange permanently mounted upon the channel-iron, an opposing tire flange mounted upon a removable split ring, and means for securing locking engagement between the channel-iron and the removable ring.

The object of the invention described and claimed in the present application is to provide a useful modification of the means for securing locking engagement between the channel-iron and the flange-bearing removable ring. I accomplish this object by means of two lugs extending downwardly from the terminals of the split ring, two slots in the channel-iron adapted to receive said lugs, and means for securing said lugs within said slots and to said channel-iron.

In the drawings Figure 1 is a perspective view of a tire and rim showing my improved means for securing the tire to the wheel. Fig. 2 is a cross-section of the tire and rim upon the broken line *x x* of Fig. 3 showing the means for securing the detachable flange to the channel-iron. Fig. 3 is a side view of the tire rim, a part being broken away to show details of construction. Fig. 4 is a plan view of a section of the channel-iron and the slots therein.

I have shown my device as applied to a tire and rim of the clencher type, in which the flanges are curved upwardly and inwardly to grasp and hold beads formed upon the tire casing, but it will be obvious to those skilled in the art that by altering the shape of the tire flanges my device can be adapted for use with tires of any form.

Referring to the drawings in Fig. 1, 1 is the wheel felly. The channel-iron 2 is adapted to be affixed thereto and carries a permanent tire flange 3, which is preferably formed thereon. At its other edge the channel-iron is extended laterally and the portion beyond the wheel felly preferably has a slight downward tendency toward the hub of the wheel. This edge terminates in an upturned retaining flange 4 extending the entire length of the rim, forming a seat for a removable ring 5 and securing it against laterally outward displacement. The conformation of this portion of the channel-iron may of course be varied. The form of the retaining flange is likewise immaterial, except that it must form a seat for the removable ring adapted to secure it from laterally outward movement. The ring 5 is continuous with the exception of a single joint or split which allows it to be attached or removed at will. It comprises a base portion and a tire retaining flange, the base portion being fitted to its seat upon the channel-iron, so that when it rests thereon and seats against the flange 4 the tire flange is in position to retain the tire. Upon the under-side of the split ring, and near its terminals, are two lugs 6 and 7, which may be cored or perforated, as shown in Figs. 2 and 3. In the portion of the channel-iron which carries the removable ring and at any convenient point upon its periphery are cut two slots shaped to receive these lugs, and so located that the lugs will enter them when the split ring is in position and its terminals contact in longitudinal alinement. Through the portion of these lugs which extends below the lower surface of the channel-iron are drilled or cored holes registering one with the other, and a headed key 8 is provided of a proper size to fit within these holes and of a length sufficient to project slightly beyond the lug 7 when the head seats against the lug 6. To secure this key in position I prefer to drill it near the extremity and to insert therein a split key or cotter pin 9.

The mode of operation of my device is as follows: To attach a tire the split ring is removed and the tire applied to the rim about its entire periphery, engaging closely with the permanent tire flange thereon. The split ring is then sprung into place about the channel-iron and one of the lugs inserted in its slot and secured there by the insertion of the pin. The other terminal of the ring is then drawn up until the two terminals contact in alinement, when the second lug will enter its slot and the key may be forced through the hole in its lug and secured by the cotter pin. In this position the tire and the removable flange are securely locked to the rim. The retaining flange 4 prevents laterally outward displacement of the ring, the bolts or lugs in the slots prevent any "creeping" or movement of the split ring about the channel-iron, the key, by seating against the under-surface of the channel-iron, secures the lugs within the slots and lock the terminals of the split ring to the said channel-iron. To remove the tire the process is reversed: the key must be removed, when the lugs can be lifted out of the slots, the split ring removed and the tire detached. The split ring should be accurately fitted to its seat upon the channel-iron, and in practice this may render it difficult to adjust the ring and to insert the second lug in its slot. To facilitate this operation, therefore, I provide the jointed lever 10 (Fig. 1); a pin 11 upon one arm is inserted in a hole 12 drilled in the split ring, near one terminal; a second pin 13 upon the other arm is inserted in a hole 14 drilled in the split ring near its other terminal, when, by means of the lever, the loose terminal of the ring may be drawn up to the other and its lug inserted in its slot.

Having described my invention what I claim is:

1. In a vehicle wheel rim the combination of a channel-iron having one tire flange permanently attached thereto, a second tire flange mounted upon a removable transversely split ring, a retaining flange upon said channel-iron, downwardly extending lugs near the terminals of said split ring, and a key adapted to pass through perforations in said lugs and to seat against the under-surface of the channel-iron.

2. Means for securing a removable tire flange to the channel-iron of a vehicle wheel rim comprising downwardly extending lugs upon said removable flange, slots in said channel-iron adapted to receive said lugs, and a key adapted to pass through perforations in said lugs and to seat against the under-surface of the said channel-iron.

3. In a vehicle wheel rim the combination of a channel-iron carrying one tire flange, a removable split ring carrying a second tire flange, downwardly extending lugs upon the said ring near its terminals, slots in said channel-iron adapted to receive said lugs, and means for locking the said lugs in said slots, comprising a key adapted to pass through the holes in said lugs and to seat against the under-surface of the channel-iron.

4. A vehicle wheel rim for resilient tires, comprising a channel-iron 2, a flange-bearing removable ring 5, cored lugs 6 and 7 upon said ring, slots in the channel-iron adapted to receive said lugs, and a key 8 adapted to pass through said lugs and to seat against the channel-iron, substantially as described.

EDWIN COUPLAND SHAW.

Witnesses:
C. C. GOODRICH,
W. K. MEANS.